(12) United States Patent
Moeller

(10) Patent No.: US 8,155,838 B2
(45) Date of Patent: Apr. 10, 2012

(54) STEERING SYSTEM AND METHOD FOR QUADRANT DEPENDANT ADAPTING OF RETURN TORQUE

(75) Inventor: Bertram Moeller, Bodenheim (DE)

(73) Assignee: Steering Solutions IP Holding Company, a Delaware corporation, Saginaw, MI (US)

( * ) Notice: Subject to any disclaimer, the term of this patent is extended or adjusted under 35 U.S.C. 154(b) by 617 days.

(21) Appl. No.: 12/354,826

(22) Filed: Jan. 16, 2009

(65) Prior Publication Data

US 2009/0192680 A1     Jul. 30, 2009

(30) Foreign Application Priority Data

Jan. 25, 2008  (EP) ..................... 08001420

(51) Int. Cl.
*B62D 5/04*     (2006.01)
(52) U.S. Cl. .......................... 701/42; 180/443
(58) Field of Classification Search .......... None
See application file for complete search history.

(56) References Cited

U.S. PATENT DOCUMENTS

| 4,837,692 A * | 6/1989 | Shimizu ..................... 701/41 |
| 4,909,343 A * | 3/1990 | Mouri et al. ................ 180/422 |
| 5,053,966 A | 10/1991 | Takahashi et al. |
| 2002/0060538 A1 | 5/2002 | Hara et al. |

FOREIGN PATENT DOCUMENTS

| DE | 3917053 A1 | 12/1989 |
| EP | 1 538 065 A2 | 6/2005 |
| EP | 1 837 266 A1 | 9/2007 |
| JP | 10-278827 | * 10/1998 |
| JP | 2003-252225 | * 9/2003 |

OTHER PUBLICATIONS

European Search Report, May 29, 2008.

* cited by examiner

*Primary Examiner* — Michael J. Zanelli
(74) *Attorney, Agent, or Firm* — Cantor Colburn LLP

(57) ABSTRACT

A method for generating a return torque signal in an electric servo steering system of a vehicle, including the steps of: determining a current steering wheel position; determining a current vehicle speed; generating a return torque signal as a function of the steering wheel position and the vehicle speed; determining a current directional relationship between a torque exerted on the steering wheel and a speed of steering wheel rotation; determining a scaling factor dependent on the directional relationship; and multiplying the return torque signal by the scaling factor in order to obtain a modified return torque signal. Also, a servo steering system which is designed to carry out such a method.

8 Claims, 2 Drawing Sheets

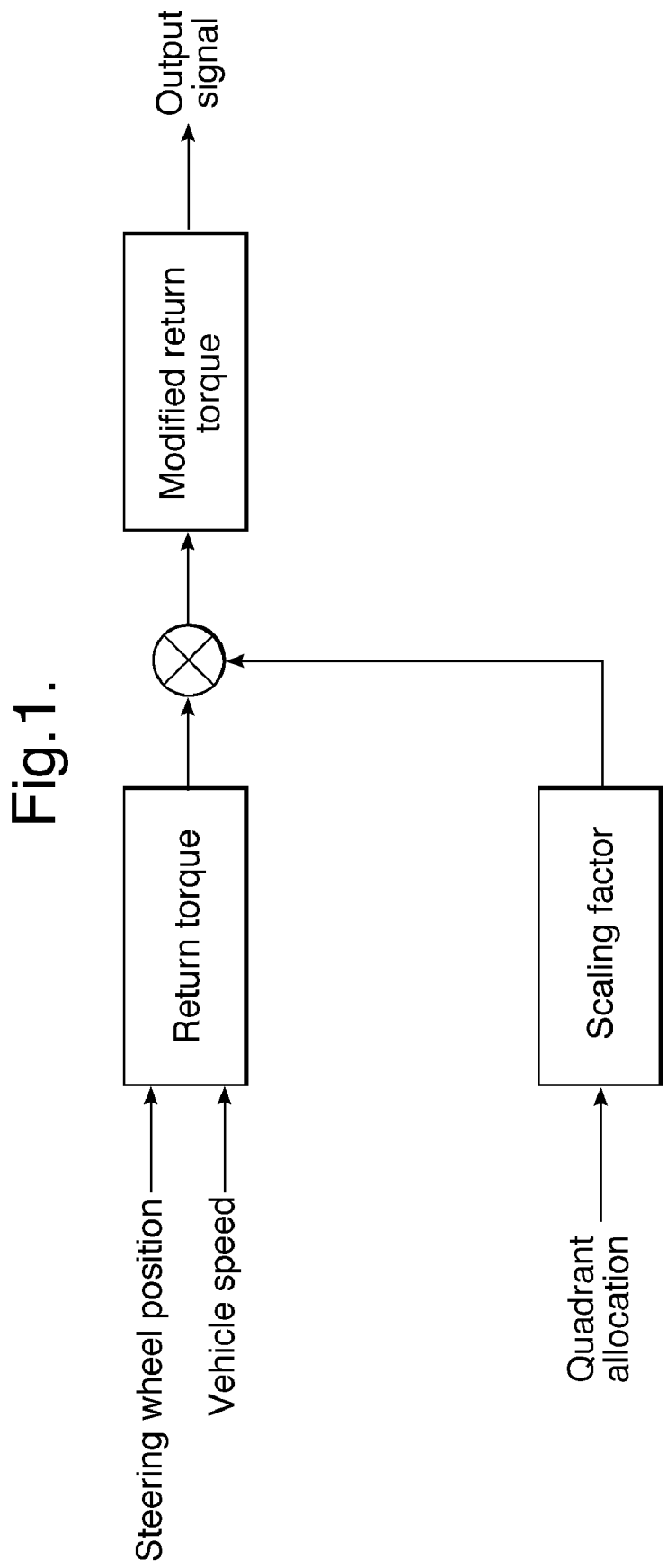

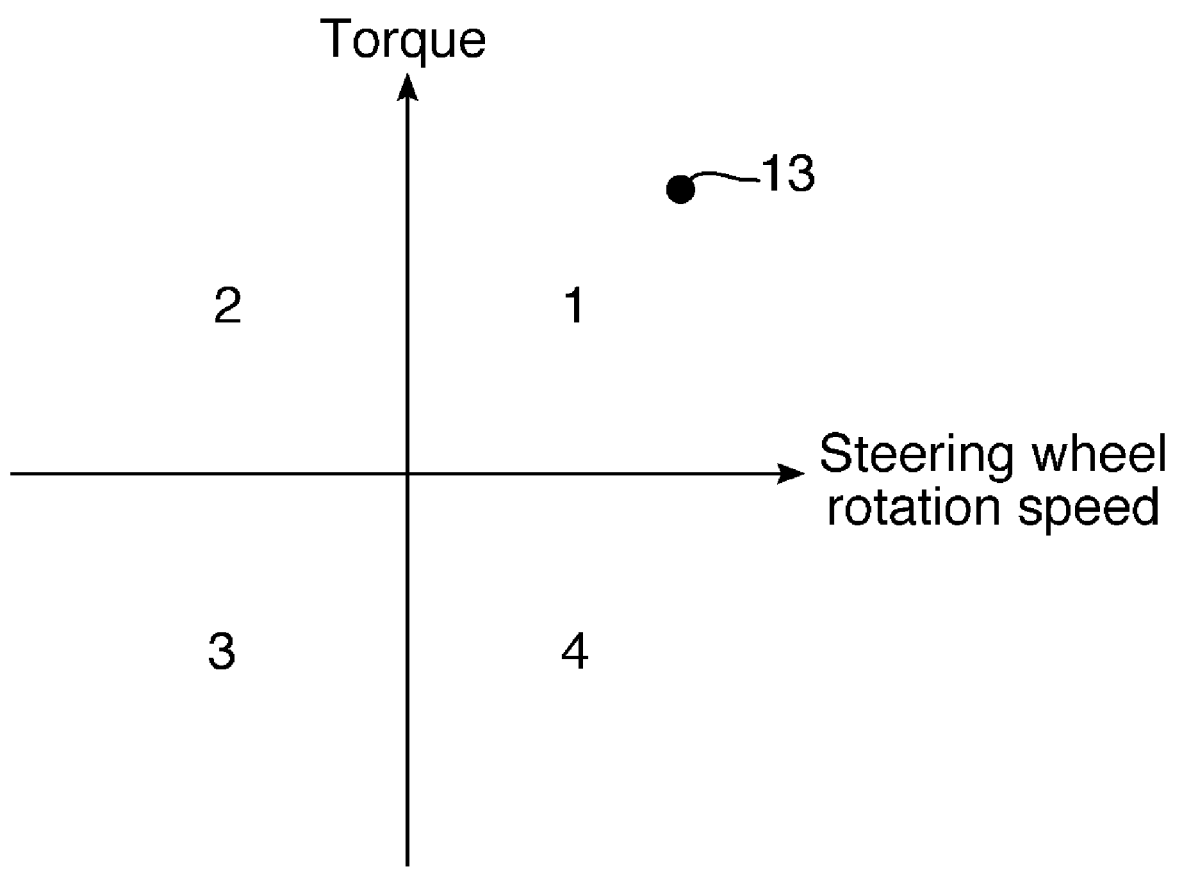

STEERING SYSTEM AND METHOD FOR QUADRANT DEPENDANT ADAPTING OF RETURN TORQUE

FIELD OF THE INVENTION

The present invention concerns steering systems and methods for generating a return torque signal in the case of, in particular, an electric servo steering system of a vehicle.

BACKGROUND OF THE INVENTION

In vehicles which are equipped with a servo steering system, such as, e.g., electric servo steering, on the basis of a torque exerted on the steering wheel by the driver there is produced a supporting torque that decreases the effort required for steering and so increases the driving comfort. The supporting torque can have superimposed on it a return torque that serves to support the natural restoring movement of the wheels towards the neutral position pointing straight ahead and so make it easier to keep to the lane during driving. The amount of the return torque is usually predetermined by a return torque signal which is generated by a control device. With known servo steering systems, the return torque signal is, for example, generated as a function of the current steering wheel position and the current vehicle speed.

A return torque determined in this way may however be disadvantageous in certain driving situations. If, for example, the vehicle is accelerated during a restoring operation, then the natural restoring force increases and the movement of the steering wheel towards the neutral position may increase undesirably quickly. Conversely, at low speeds the return torque may be too low to maintain the restoring movement or set it in motion. Further, usually a high return torque is necessary with low steering angles, because here the automatic restoring force is small. If, however, the driver performs steering maneuvers within this range around the neutral position, then a rigid steering feel or undesirably quick restoring movement of the steering wheel may occur.

SUMMARY OF THE INVENTION

It is therefore the object of the invention to generate a better-adapted return torque signal in order to eliminate the above disadvantages.

This object is achieved in an electric servo steering system of a vehicle, by a method for generating a return torque signal including the steps of: determining a current steering wheel position; determining a current vehicle speed; generating a return torque signal as a function of the steering wheel position and the vehicle speed; determining a current directional relationship between a torque exerted on the steering wheel and a speed of steering wheel rotation; determining a scaling factor dependent on the directional relationship; and multiplying the return torque signal by the scaling factor in order to obtain a modified return torque signal.

According to the invention, a current directional relationship is determined between a torque exerted on the steering wheel and a speed of steering wheel rotation, a scaling factor dependent on the directional relationship is determined, and the return torque signal is multiplied by the scaling factor in order to obtain a modified return torque signal.

By taking into consideration the directional relationship between the torque exerted on the steering wheel and the speed of steering wheel rotation when generating the return torque signal, the conflict between inadequate return during a restoring operation and excessively high steering resistance during a steering maneuver can be resolved. As a result, it is possible to meet the special requirements of different driving situations and so improve the driving comfort.

Preferably, the scaling factor is set at a first constant value when the torque and the speed of steering wheel rotation are in the same direction. This procedure allows for the fact that only a low return torque is necessary with an active steering maneuver.

According to a preferred embodiment, the scaling factor is set at a second constant value different from the first value when the torque and the speed of steering wheel rotation are in opposite directions. As a result, for example during the restoring operation, a high return torque can be provided in order to ensure prompt orientation in the straight-ahead position. Preferably, the constant values are therefore selected such that the first value is lower than the second value.

Preferably, the scaling factor is further determined on the basis of dependence on the vehicle speed. In this way, the speed-dependent automatic restoration of the chassis can be taken into consideration.

According to a preferred embodiment, the directional relationship is determined with the aid of quadrant allocation of the current operating point of the servo steering control in a torque-speed diagram. Quadrant allocation can, for example, be carried out anyway and therefore can be used advantageously.

The object is further achieved by a servo steering system which is designed to carry out a method according to the invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic block diagram of a servo steering control system which carries out the method according to the invention; and FIG. 2 is a diagram which shows by way of example a torque-speed diagram with associated quadrant division.

DETAILED DESCRIPTION OF THE INVENTION

The method shown schematically in FIG. 1 can be carried out, for example, in the control device of an electric servo steering system of a motor vehicle, as known from the state of the art. Electric servo steering systems provide a steering torque by means of an electric motor or other electric actuating element coupled directly or indirectly to the steering gear. The amount of torque is determined with the aid of torque signals which are generated by the control device. For instance, a supporting torque signal, a damping torque signal and a return torque signal can be generated, which are superimposed by the control device in order to generate a total torque output signal which is outputted to the electric motor.

The control device receives different signals from vehicle sensors. In particular, on the vehicle, not shown, are provided sensors for measuring the current steering wheel position, the current vehicle speed, the current speed of steering wheel rotation and the driver torque exerted on the steering wheel. The speed of steering wheel rotation can for example be determined from the variation in time of the steering wheel position or steering angle.

A return torque signal is generated as a function of the steering wheel position and the vehicle speed. The return torque signal generated is modified on the basis of a scaling factor or multiplier as in FIG. 1. The control system determines a directional relationship between the torque exerted on the steering wheel and the speed of steering wheel rotation. The torque exerted on the steering wheel can be the torque exerted by the driver or the supporting torque provided by the motor of the servo steering system. The speed of steering wheel rotation can relate either to the steering wheel itself or to a component connected with the steering wheel such as e.g. the motor of the servo steering system or a corresponding transmission element. The scaling factor is selected as a function of the directional relationship. Therefore a different scaling factor is applied, depending on whether the torque and the speed of steering wheel rotation are in the same direction or opposite directions. This means that a basic distinction is made between driving situations in which return of the wheel position to a direction pointing straight ahead takes place, and those in which the driver performs a steering maneuver. If, for example, the driver steers into a bend, the torque and speed of steering wheel rotation point in the same direction and a low scaling factor is selected to reduce the return torque signal and so prevent too high a resistance to the steering movement. If, however, the vehicle is guided back to the straight-ahead position, the torque and speed of steering wheel rotation point in opposite directions and a high return torque signal is outputted to ensure reliable return.

The directional relationship between driver torque and speed of steering wheel rotation is determined advantageously according to the quadrant allocation of motor control shown in FIG. 2. The current operating point 13 of the servo steering control system in the torque-speed diagram is in each case located in one of quadrants 1, 2, 3 or 4. If the operating point 13 is in quadrant 2 or 4, the presence of an active steering maneuver is determined. If, on the other hand, the operating point is in quadrant 1 or 3, then it is determined that return is just being carried out. Hence the control system can with the aid of quadrant allocation distinguish directly between the different driving situations to be taken into account.

It is particularly advantageous here that this quadrant allocation be provided by the already existing control algorithm of the electric servo steering system, so that the effort for carrying out the described method is small.

Suitably, the scaling factor is, in addition, determined as a function of the vehicle speed, i.e. every vehicle speed is assigned two amounts for the scaling factor: one for quadrants 1 and 3 and one for quadrants 2 and 4. The values can be obtained from a look-up table which can easily be updated with respect to the steering behavior in the case of desired changes.

In general the invention allows an improvement in the return support function of servo steering systems, avoiding, on the one hand, a rigid steering feel and undesirably high effort during steering and, on the other hand, an inadequate return force.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or system to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for generating a return torque signal in an electric servo steering system of a vehicle, comprising the steps of:
    determining a current steering wheel position;
    determining a current vehicle speed;
    generating a return torque signal as a function of the steering wheel position and the vehicle speed;
    determining a current directional relationship between a torque exerted on the steering wheel and a speed of steering wheel rotation, wherein the directional relationship is determined with the aid of quadrant allocation of the current operating point of the servo steering control in a torque-speed diagram;
    determining a scaling factor dependent on the directional relationship; and
    multiplying the return torque signal by the scaling factor in order to obtain a modified return torque signal.

2. A method according to claim 1, wherein the scaling factor is set at a first constant value when the torque and the speed of steering wheel rotation are in the same direction.

3. A method according to claim 2, wherein the scaling factor is set at a second constant value different from the first constant value when the torque and the speed of steering wheel rotation are in opposite directions.

4. A method according to claim 3, wherein the first and second constant values are selected such that the first constant value is lower than the second constant value.

5. A method according to claim 1, wherein the scaling factor is further determined on the basis of dependence on the vehicle speed.

6. A servo steering system which is designed to carry out a method according to claim 1.

7. A method for generating a return torque signal in an electric servo steering system of a vehicle, comprising the steps of:
    determining a current steering wheel position;
    determining a current vehicle speed;
    generating a return torque signal as a function of the steering wheel position and the vehicle speed;
    determining a current directional relationship where the directional relationship is determined with the aid of quadrant allocation of the current operating point of the servo steering control in a torque-speed diagram;
    determining a scaling factor dependent on the directional relationship; and
    multiplying the return torque signal by the scaling factor in order to obtain a modified return torque signal.

8. A servo steering system which is designed to carry out a method according to claim 7.

* * * * *